(12) United States Patent
Yonezawa

(10) Patent No.: US 10,302,993 B2
(45) Date of Patent: May 28, 2019

(54) DISPLAY PANEL, DISPLAY APPARATUS AND LAMINATE

(71) Applicant: Sakai Display Products Corporation, Sakai-shi, Osaka (JP)

(72) Inventor: Nobuhiro Yonezawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/735,522

(22) PCT Filed: Jun. 22, 2015

(86) PCT No.: PCT/JP2015/067856
§ 371 (c)(1),
(2) Date: Dec. 11, 2017

(87) PCT Pub. No.: WO2016/207943
PCT Pub. Date: Dec. 29, 2016

(65) Prior Publication Data
US 2018/0173051 A1  Jun. 21, 2018

(51) Int. Cl.
*G02F 1/1335* (2006.01)

(52) U.S. Cl.
CPC .. *G02F 1/133528* (2013.01); *G02F 1/133512* (2013.01); *G02F 1/133514* (2013.01); *G02F 2201/501* (2013.01); *G02F 2202/28* (2013.01)

(58) Field of Classification Search
CPC ............ G02F 1/133528; G02F 1/133512
See application file for complete search history.

(56) References Cited

U.S. PATENT DOCUMENTS 6,068,794 A * 5/2000 Kobayashi ............ G02B 1/105
252/585

FOREIGN PATENT DOCUMENTS

| JP | H02-27121 U | 2/1990 |
|---|---|---|
| JP | 2001-64607 A | 3/2001 |
| JP | 2010-176022 A | 8/2010 |
| JP | 2010-237354 A | 10/2010 |
| JP | 2014-112232 A | 6/2014 |

* cited by examiner

*Primary Examiner* — Phu Vu
(74) *Attorney, Agent, or Firm* — Bret E. Field; Bozicevic, Field & Francis LLP

(57) ABSTRACT

An example display panel, comprises: a display plate having a plurality of display elements; an adhesive layer laminated on the display plate; a polarizing plate laminated on the display plate through the adhesive layer; and a hydrophilic material layer laminated between the display plate and the adhesive layer.

12 Claims, 8 Drawing Sheets

DISPLAY PANEL, DISPLAY APPARATUS AND LAMINATE

CROSS-REFERENCE TO RELATED APPLICATIONS

This application is the national phase under 35 U.S.C. § 371 of PCT International Application No. PCT/JP2015/067856 which has International filing date of Jun. 22, 2015 and designated the United States of America.

FIELD

The present disclosure relates to a display panel and a display apparatus in which a display plate having a plurality of display elements and a polarizing plate are laminated. In addition, the present disclosure relates to a laminate in which sheet-shaped or plate-shaped components are laminated.

BACKGROUND

Conventionally, it is known that a display panel including a display plate in which display elements having a liquid crystal material, an organic electro-luminescence (EL) element, or the like are arranged in a matrix shape, and a polarizing plate laminated on front surface side of the display plate. In general, the display plate and the polarizing plate are firmly bonded to each other by an adhesive, thereby quality of the display panel is secured.

Conventionally, a method is known that firmly adheres each component when a plurality of components are bonded to each other by the adhesive (see, for example, Japanese Patent Laid-open Publication No. 2001-64607 and Japanese Patent Laid-open Publication No. 2010-176022).

SUMMARY

During bonding work of the polarizing plate and the display plate, if a defect in which bubbles, foreign matters, etc. are mixed between the polarizing plate and display plate, or the like occurs, it is necessary to peel off the polarizing plate from the display plate to remove the defect, and further, bond the polarizing plate and the display plate to each other again. However, since the display plate and the polarizing plate are firmly bonded to each other by the adhesive, the display plate or the polarizing plate may be damaged during the peeling-off work of the polarizing plate. Similarly, also in a laminate in which plate-shaped or sheet-shaped components are bonded to each other by the adhesive, a damage in the components may occur during the peeling-off work of the components.

In addition, since the adhesive may remain on the front surface of the display plate after peeling-off, after the remaining adhesive is wiped, the polarizing plate and the display plate are bonded to each other again. However, depending on how to wipe the remaining adhesive, the adhesive may be adhered to a forming place of an electrode which is a conductive portion with a driving circuit, thereby resulting in poor conduction. Similarly, also in the laminate, a defect may occur due to adhesion of the adhesive remaining on a part of the components.

In the methods described in Japanese Patent Laid-open Publication No. 2001-64607 and Japanese Patent Laid-open Publication No. 2010-176022, the above problems are not considered.

In consideration of the above-mentioned circumstances, it is an object to provide a display panel and a display apparatus including a display plate having a plurality of display elements and a polarizing plate laminated on the display plate through an adhesive layer, wherein the display panel and the display apparatus facilitate a peeling-off work of the display plate and the polarizing plate, and may reduce a residual adhesive on the display plate. It is another object to provide a laminate in which a first object and a second object of a plate shape or a sheet shape are laminated through an adhesive layer, wherein the laminate facilitates a peeling-off work of the first object and the second object, and may reduce a residual adhesive on the first object or the second object.

According to an aspect of the present disclosure, there is provided a display panel which comprises a display plate having a plurality of display elements, an adhesive layer laminated on the display plate, and a polarizing plate laminated on the display plate through the adhesive layer, the display panel comprising: a hydrophilic material layer laminated between the display plate and the adhesive layer.

According to an aspect of the present disclosure, the hydrophilic material layer is laminated between the display plate and the adhesive layer. Accordingly, even when the display plate and the polarizing plate are firmly bonded to each other by the adhesive layer, by applying water to the hydrophilic material layer laminated on the adhesive layer, entrance of water into a boundary between the adhesive layer and the hydrophilic material layer, dissolution of the hydrophilic material layer, or the like occurs. Therefore, it is possible to facilitate a peeling-off work of the display plate and the polarizing plate. In addition, there is a region in which the hydrophilic material layer is interposed between the display plate and the adhesive layer. Accordingly, by peeling-off the display plate and the polarizing plate while applying water to the hydrophilic material layer, the adhesive layer does not remain in the corresponding region of the display plate. Therefore, it is possible to reduce a residual adhesive on the display plate.

In the display apparatus according to another aspect of the present disclosure, wherein the hydrophilic material layer is laminated on a region other than peripheral edge parts of the adhesive layer.

According to another aspect of the present disclosure, the hydrophilic material layer is laminated on the region other than the peripheral edge parts of the adhesive layer. That is, the hydrophilic material layer is not laminated on the peripheral edge part of the adhesive layer. Accordingly, when the peripheral edge part of the adhesive layer is not removed, the side surface of the hydrophilic material layer is not exposed, and the polarizing plate and the display plate are not easily peeled-off, such that a quality of the display panel may be secured. In addition, when peeling-off the polarizing plate and the display plate, it is sufficient to remove the peripheral edge part of the adhesive layer and apply water to the side surface of the exposed hydrophilic material layer, such that the peeling-off work may be facilitated.

In the display apparatus according to another aspect of the present disclosure, wherein the region includes a frame-shaped first region inside from the peripheral edge parts, and a second region formed inside from the first region at an interval.

According to another aspect of the present disclosure, the region of the adhesive layer on which the hydrophilic material layer is laminated has the frame-shaped first region inside from the peripheral edge parts of the adhesive layer, and the second region formed inside from the first region at an interval. That is, the hydrophilic material layer is not laminated on a region outside the first region and a region between the first region and the second region in the adhesive layer. Accordingly, even if water enters into the first region, since entrance of the water into the second region may be prevented, a quality of the display panel may be more adequately secured.

In the display apparatus according to another aspect of the present disclosure, wherein the hydrophilic material layer is laminated on a region including peripheral edge parts of the adhesive layer, and comprising a covering part which covers a side surface of the hydrophilic material layer.

According to another aspect of the present disclosure, the hydrophilic material layer is laminated on the region including the peripheral edge parts of the adhesive layer. The covering part covers the side surface of the hydrophilic material layer. Accordingly, the covering part includes, for example, a material having water resistance, whereby the display panel may prevent water from entering from the side surface of the hydrophilic material layer, such that the quality thereof may be secured. In addition, when peeling-off the polarizing plate and the display plate, it is sufficient to remove the covering part and apply water to the side surface of the exposed hydrophilic material layer, such that the peeling-off work may be facilitated.

In the display apparatus according to another aspect of the present disclosure, wherein a plurality of the hydrophilic material layers are provided in a matrix shape.

According to another aspect of the present disclosure, the plurality of hydrophilic material layers are provided in a matrix shape. That is, the hydrophilic material layer is not formed between prescribed regions of the adhesive layer. Therefore, even if water enters into one prescribed region, the water does not enter into the other prescribed region, and the polarizing plate and the display plate are not easily peeled-off, such that the quality of the display panel may be more adequately secured.

In the display apparatus according to another aspect of the present disclosure, wherein the hydrophilic material layer is made of a material having a contact angle of water of a prescribed angle or less.

According to another aspect of the present disclosure, the hydrophilic material layer is made of the material having the contact angle of water of a prescribed angle or less. Accordingly, the hydrophilic material layer is made of, for example, a material having a so-called superhydrophilicity with a contact angle of water of about 10 degrees or less, whereby entrance of water into the boundary between the adhesive layer and the hydrophilic material layer, dissolution of the hydrophilic material layer, or the like more efficiently occur. Therefore, the peeling-off work of the display plate and the polarizing plate may be more easily performed.

In the display apparatus according to another aspect of the present disclosure, wherein the display plate has substrates facing each other, and a liquid crystal material is sealed between the substrates, and the polarizing plates are laminated on each of surface sides of the display plate.

According to another aspect of the present disclosure, in the display plate, the liquid crystal material is sealed between the substrates facing each other. In addition, the polarizing plates are laminated on both surfaces of the display plate through the adhesive layer, respectively. Therefore, it is possible to achieve a display apparatus including a liquid crystal display panel which facilitates the peeling-off work of the display plate and the polarizing plate, and may reduce the residual adhesive on the display plate.

According to an aspect of the present disclosure, there is provided a display apparatus comprising the display panel as describe above.

According to an aspect of the present disclosure, the display apparatus includes the above-described display panel. Accordingly, it is possible to achieve a display apparatus including the display panel which facilitates the peeling-off work of the display plate and the polarizing plate, and may reduce the residual adhesive on the display plate.

According to an aspect of the present disclosure, there is provided a laminate which comprises a sheet-shaped or plate-shaped first object, an adhesive layer laminated on the first object, and a second object formed in a sheet shape or plate shape, and laminated on the first object through the adhesive layer, the laminate comprising: a hydrophilic material layer laminated between the first object or the second object and the adhesive layer, wherein the hydrophilic material layer is laminated on a region other than peripheral edge parts of the adhesive layer.

According to an aspect of the present disclosure, the hydrophilic material layer is laminated between the first object or the second object and the adhesive layer. Accordingly, even when the first object and the second object are firmly bonded to each other by the adhesive layer, by applying water to the hydrophilic material layer laminated on the adhesive layer, entrance of water into the boundary between the adhesive layer and the hydrophilic material layer, dissolution of the hydrophilic material layer, or the like occurs. Therefore, it is possible to facilitate the peeling-off work of the first object and the second object. In addition, the first object or the second object has a region in which the hydrophilic material layer is interposed between the same and the adhesive layer. Accordingly, by performing the peeling-off work of the first object and the second object while applying water to the hydrophilic material layer, the adhesive layer does not remain in the corresponding region of the first object or the second object. Therefore, it is possible to reduce the residual adhesive on the first object or the second object.

In addition, the hydrophilic material layer is laminated on the region other than the peripheral edge parts of the adhesive layer. That is, the hydrophilic material layer is not laminated on the peripheral edge part of the adhesive layer. Accordingly, when the peripheral edge part of the adhesive layer is not removed, the side surface of the hydrophilic material layer is not exposed, and the first object and the second object are not easily peeled-off, such that the quality of the laminate may be secured. In addition, when peeling-off the first object and the second object, it is sufficient to only remove the peripheral edge part of the adhesive layer and apply water to the side surface of the exposed hydrophilic material layer, such that the peeling-off work may be facilitated.

According to an aspect of the present disclosure, there is provided a laminate which comprises a sheet-shaped or plate-shaped first object, an adhesive layer laminated on the first object, and a second object formed in a sheet shape or plate shape, and laminated on the first object through the adhesive layer, the laminate comprising: a hydrophilic material layer laminated between the first object or the second object and the adhesive layer, wherein the hydrophilic material layer is laminated on a region other than peripheral edge parts of the adhesive layer, and further comprising a covering part which covers a side surface of the hydrophilic material layer.

According to an aspect of the present disclosure, the hydrophilic material layer is laminated between the first object or the second object and the adhesive layer. Accordingly, even when the first object and the second object are firmly bonded to each other by the adhesive layer, by applying water to the hydrophilic material layer laminated on the adhesive layer, entrance of water into the boundary between the adhesive layer and the hydrophilic material layer, dissolution of the hydrophilic material layer, or the like occurs. Therefore, it is possible to facilitate the peeling-off work of the first object and the second object. In addition, the first object or the second object has the region in which the hydrophilic material layer is interposed between the same and the adhesive layer. Accordingly, by performing the peeling-off work of the first object and the second object while applying water to the hydrophilic material layer, the adhesive layer does not remain in the corresponding region of the first object or the second object. Therefore, it is possible to reduce the residual adhesive on the first object or the second object.

In addition, the hydrophilic material layer is laminated on the region including the peripheral edge parts of the adhesive layer, and the covering part covers the side surface of the hydrophilic material layer. Accordingly, for example, the covering part includes a material having water resistance, whereby the laminate may prevent water from entering from the side surface of the hydrophilic material layer, such that the quality thereof may be secured. In addition, when peeling the first object and the second object, it is sufficient to remove the covering part and apply water to the side surface of the exposed hydrophilic material layer, such that the peeling-off work may be facilitated.

According to an aspect of the present disclosure, in the display panel and the display apparatus including the display plate having the plurality of display elements and the polarizing plate laminated on the display plate through the adhesive layer, it is possible to facilitate the peeling-off work of the display plate and the polarizing plate, and reduce the residual adhesive on the display plate. In addition, according to an aspect of the present disclosure, in the laminate in which the first object and the second object of a plate shape or a sheet shape are laminated through the adhesive layer, it is possible to facilitate the peeling-off work of the first object and the second object, and reduce the residual adhesive on the first object or the second object.

The above and further objects and features will more fully be apparent from the following detailed description with accompanying drawings.

DETAILED DESCRIPTION

Hereinafter, the present disclosure will be described in detail with reference to the accompanying drawings illustrating embodiments thereof.

Embodiment 1

Figure 1:
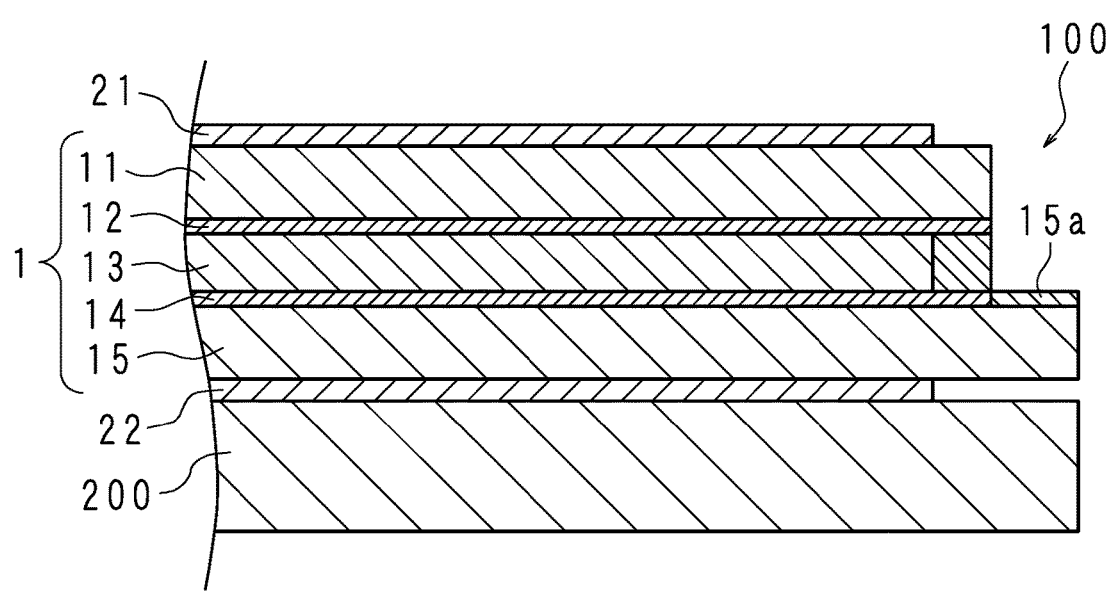
FIG. 1 is a cross-sectional view illustrating a main part of a display apparatus according to Embodiment 1.

FIG. 1 is a cross-sectional view illustrating a main part of a display apparatus according to Embodiment 1. The display apparatus according to Embodiment 1 includes a display panel 100 and a backlight 200. The display panel 100 includes a display plate 1 and polarizing plates 21 and 22. If an upper side of the paper surface in FIG. 1 is referred to as a side facing a viewer, in the display apparatus, the polarizing plate 21, the display plate 1, the polarizing plate 22, and the backlight 200 are laminated in an order from the side facing the viewer. The polarizing plate 21 and the polarizing plate 22 are intended to deflect light entering into or emitted from in a specific direction, so that the light passing through the polarizing plate 21 and the light passing through the polarizing plate 22 have different polarization directions by 90 degrees.

In the display plate 1, a color filter substrate 11, an alignment film 12, a liquid crystal layer 13, an alignment film 14, and an array substrate 15 are laminated in an order from the polarizing plate 21 side. The color filter substrate 11 has, for example, a color filter layer formed on back surface of a rectangular substrate on the alignment film 12 side. The substrate is made of, for example, inorganic glass such as quartz glass, borosilicate glass, or soda glass, plastic such as polyethylene terephthalate (PET), polyethersulfone (PES), or polycarbonate (PC) and the like. The color filter layer includes, for example, three color filters of red, blue and green, and a black matrix.

The array substrate 15 has a plurality of display elements and a plurality of signal wirings used for driving the display elements, which are formed on back surface of a rectangular substrate on the alignment film 14 side. The rectangular substrate in the array substrate 15 is made of the same material as the substrate of the color filter substrate 11. The display element, for example, includes a thin film transistor (TFT) and a pixel electrode. In addition, the array substrate 15 has an electrode part 15a which is formed on a peripheral edge part of the back surface thereof to be connected to the signal wiring, while the alignment film 14 is not laminated thereon. For example, the electrode part 15a is connected with a driver IC used for driving the display element.

The liquid crystal layer 13 is a layer of a liquid crystal material sealed in a void secured between the color filter substrate 11 and the array substrate 15. The alignment films 12 and 14 are made of a resin such as polyimide (PI), and align the liquid crystal material of the liquid crystal layer 13.

The backlight 200 converts light from a light source such as a light emitting diode (LED), for example, into planar light, and irradiates the polarizing plate 22 with the planar light. The display panel 100 receives the light emitted from the backlight 200, and displays an image on the side facing the viewer. That is, the display panel 100 corresponds to a display unit of the display apparatus according to Embodiment 1. Further, various configurations known may be applied to the backlight 200.

Figure 2:
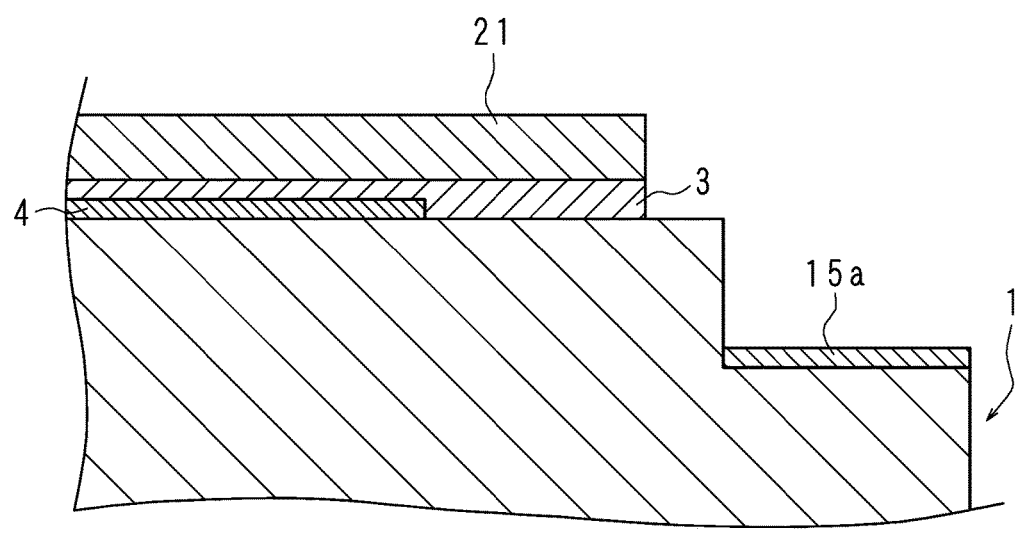
FIG. 2 is an enlarged cross-sectional view illustrating an adhesive part of a display plate and a polarizing plate.
Figure 3:
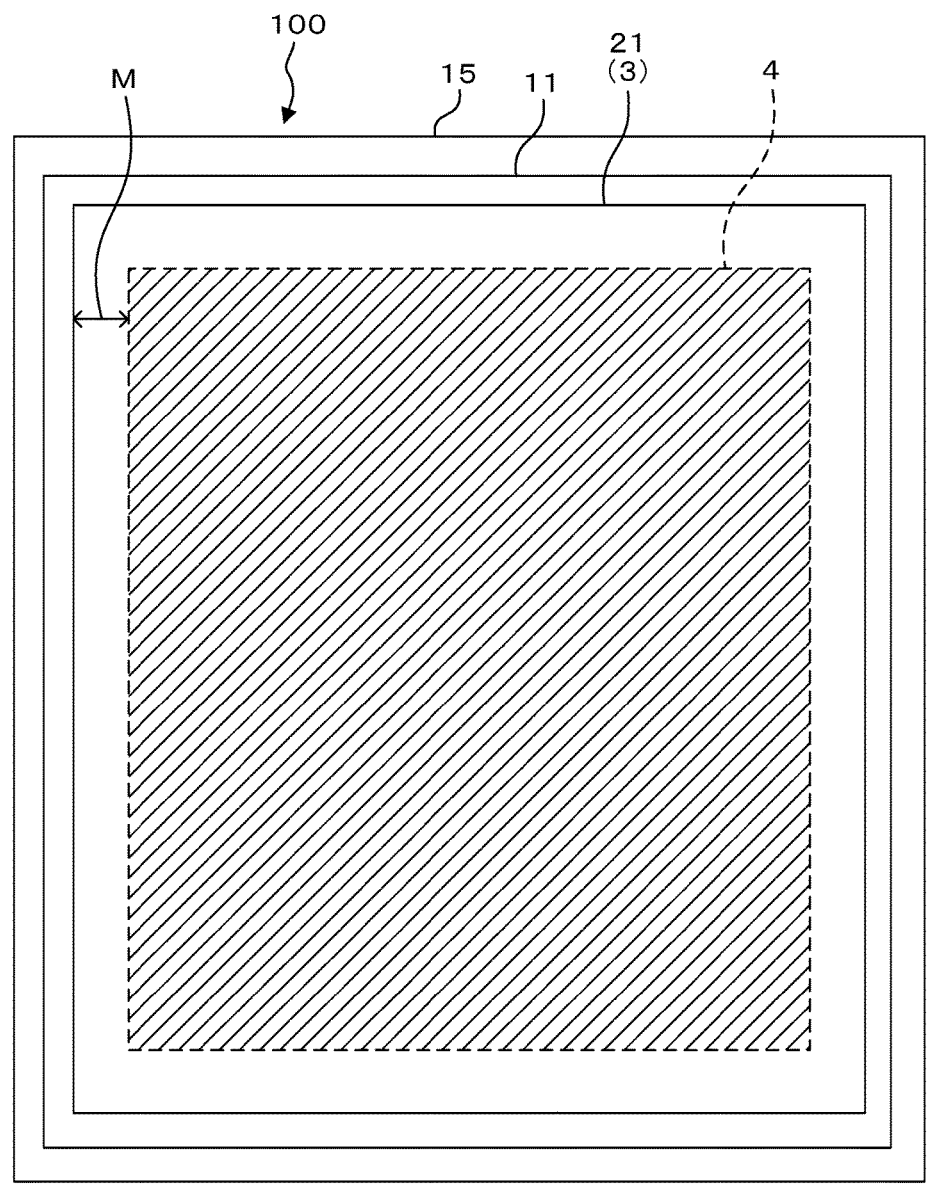
FIG. 3 is a plan view of a display panel.

In the display panel 100 of the display apparatus configured as described above, the polarizing plates 21 and 22 are bonded to the display plate 1 by an adhesive, respectively. FIG. 2 is an enlarged cross-sectional view illustrating an adhesion portion between the display plate 1 and the polarizing plate 21, and FIG. 3 is a plan view of the display panel 100. A water-resistant adhesive layer 3 is laminated on an entire surface of the polarizing plate 21 facing the display plate 1. A hydrophilic material layer 4 is laminated on a prescribed region of adhesive surface of the adhesive layer 3 on the display plate 1 side. The prescribed region is a region other than peripheral edge parts of the adhesive layer having a width of dimension M, and is a region illustrated by the hatching in FIG. 3. The dimension M is not intended to particularly limit, but is, for example, about 10 mm. The hydrophilic material layer 4 is not intended to particularly limit, but is made of, for example, a material having a so-called superhydrophilicity with a contact angle of water of about 10 degrees or less. In addition, the peripheral edge parts of the adhesive surface of the adhesive layer 3 on the display plate 1 side and fixing surface of the hydrophilic material layer 4 on the display plate 1 side are fixed to the display plate 1, respectively. That is, by bonding the display plate 1 and the polarizing plate 21 to each other, the polarizing plate 21 is laminated on the display plate 1 through the hydrophilic material layer 4 and the adhesive layer 3 laminated while covering the hydrophilic material layer 4. Further, a mode in which the polarizing plate 22 is bonded to the display plate 1 is the same as the mode in which the polarizing plate 21 is bonded to the display plate 1, and therefore will not be described.

Figure 4:
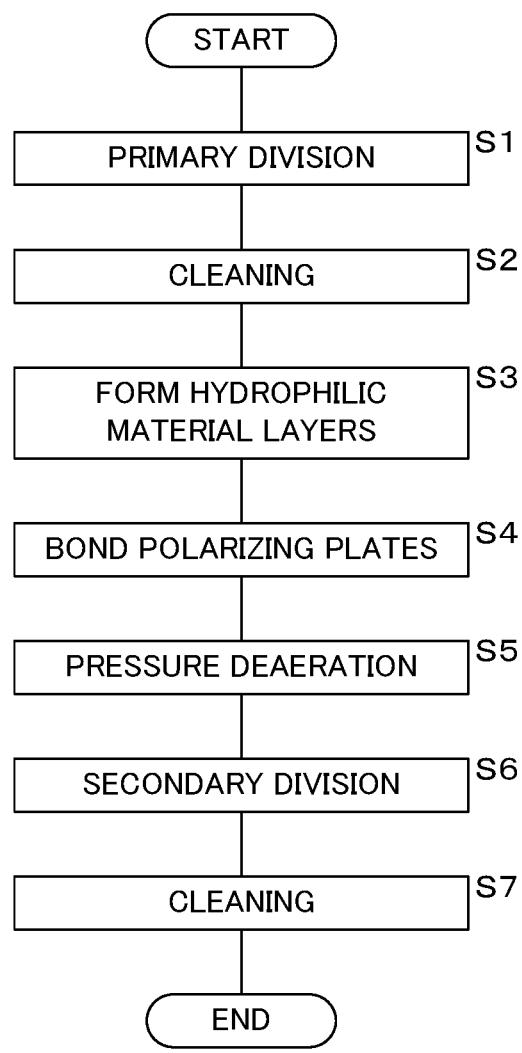
FIG. 4 is a flowchart illustrating a manufacturing process of the display panel.
Figure 5A:
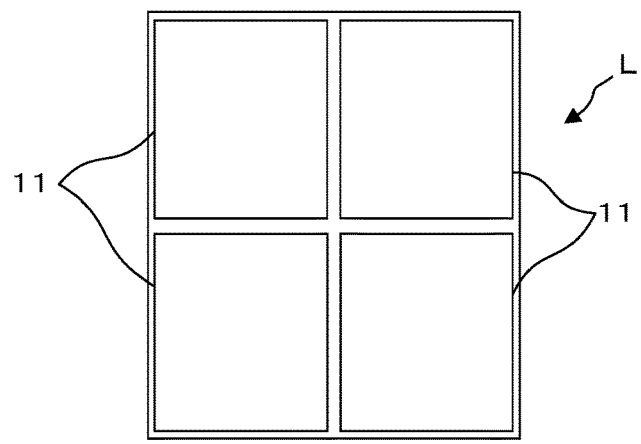
FIG. 5A is an explanatory view describing an example of a manufacturing process of a display panel.
Figure 5B:
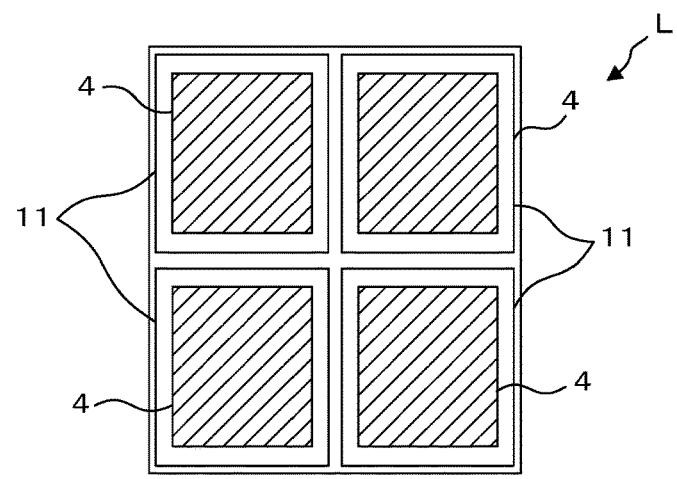
FIG. 5B is an explanatory view describing an example of the manufacturing process of a display panel.
Figure 5C:
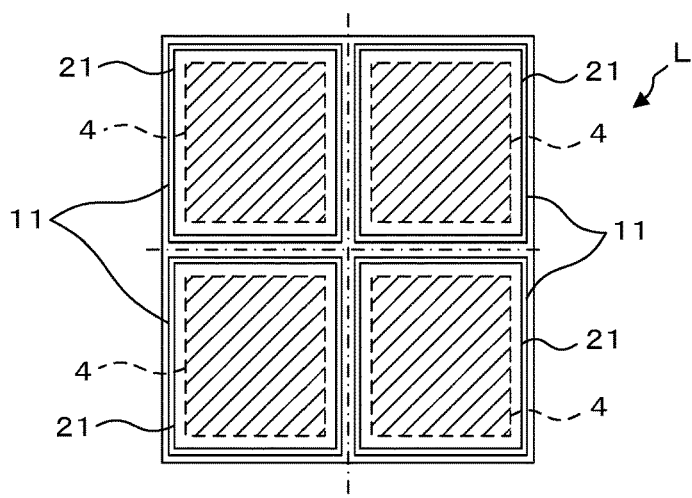
FIG. 5C is an explanatory view describing an example of the manufacturing process of the display panel.

Next, a manufacturing process of the display panel 100 will be described. FIG. 4 is a flowchart illustrating the manufacturing process of the display panel 100, and FIGS. 5A, 5B and 5C are explanatory views describing an example of the manufacturing process of the display panel 100, respectively. FIGS. 5A, 5B and 5C illustrate the display plate 1 after a primary division to be described below, and hereinafter, in explaining the manufacturing process illustrated by the flowchart of FIG. 4, FIGS. 5A, 5B and 5C will be also appropriately referred to.

First, the primary division of the display plate 1 is performed (step S1). The primary division is a process of dividing the display plate 1 having forming areas of a plurality of display panels 100 into the display plate 1 having forming areas of the smaller number of the display panels 100 than the corresponding plurality of display panels. Hereinafter, the display plate 1 after the primary division is referred to as a large-size panel, and a reference numeral L is denoted thereto in FIGS. 5A, 5B and 5C. As illustrated in FIG. 5A, the large-size panel L has a plurality of color filter substrate 11 single plates laminated at corresponding positions on a substrate in which a plurality of array substrates 15 used for the display panel 100 are continued. In the example illustrated in FIG. 5A, the large-size panel L has forming areas of four display panels 100. Next, cleaning of the large-size panel L is performed (step S2). The reason for cleaning is to remove glass waste, which is referred to as a so-called cullet, generated during the primary division from the large-size panel L.

Thereafter, hydrophilic material layers 4 are formed on both surfaces of the cleaned large-size panel L (step S3). Specifically, the hydrophilic material layers 4 as many as the number of forming areas of the display panel 100 are formed on each of surfaces of the large-size panel L. In the example illustrated in FIG. 5B, the hydrophilic material layers 4 are formed at four places on front surface of the large-size panel L. The hydrophilic material layer 4 is formed, for example, by applying a paint containing a hydrophilic material to the corresponding position of the display plate 1, and then drying the paint.

Next, the polarizing plates 21 and 22 are bonded to both surfaces of the large-size panel L on which the hydrophilic material layers 4 are formed (step S4). The polarizing plates 21 and 22 have, for example, the adhesive layer 3 formed on back surface thereof in advance, and are bonded to corresponding positions on both surfaces of the large-size panel L from the back surface. In the example illustrated in FIG. 5C, four polarizing plates 21 are bonded to the large-size panel L while covering the hydrophilic material layers 4.

Thereafter, pressure deaeration of the large-size panel L to which the polarizing plates 21 and 22 are bonded is performed (step S5). For example, the large-size panel L to which the polarizing plates 21 and 22 are bonded is subjected to the pressure deaeration by an autoclave known. Even if a void is formed between a stepped part of the hydrophilic material layer 4 and the large-size panel L and the adhesive layer 3 when the polarizing plate 21 is bonded, by performing the pressure deaeration, the adhesive layer 3 and the hydrophilic material layer 4 may be in close contact with each other as illustrated in FIG. 2. Since the void causes a deterioration in a display quality of the display panel 100, by performing the pressure deaeration process, the corresponding degradation in the display quality may be prevented. Further, depending on the material of the adhesive layer 3 and the bonding mode of the polarizing plate 21, it is possible to prevent an occurrence of the void, such that the process of step S5 may not be performed.

Thereafter, secondary division of the pressure deaerated large-size panel L is performed (step S6). The secondary division is a process of cutting out the display panels 100 from the large-size panel L. In the example illustrated in FIG. 5C, four display panels 100 are cut out by dividing the large-size panel L along one-dot chain lines. Thereafter, in order to remove the cullet generated by the secondary division, cleaning of the cut out display panels 100 is performed (step S7), and the manufacturing process of the display panel 100 is ended.

In the display panel 100 configured as described above, when bonding the polarizing plate 21 or 22 to the display plate 1, if a defect in which, for example, bubbles, foreign matters, etc. are mixed therebetween occurs, the polarizing plate 21 or 22 having the occurred defect is peeled-off from the display plate 1. Then, it is necessary to remove the defect, and further, bond the peeled-off polarizing plate 21 or 22 to the display plate 1 again. In the display panel 100 of Embodiment 1, when peeling-off the polarizing plates 21 and 22 from the display plate 1, the peripheral edge part of the adhesive layer 3 is removed, and water is applied to the exposed hydrophilic material layer 4. By applying the water to the hydrophilic material layer 4 laminated on the adhesive layer 3, entrance of the water into a boundary between the adhesive layer 3 and the hydrophilic material layer 4, dissolution of the hydrophilic material layer 4, or the like occurs, and it becomes a state in which the display plate 1 is likely to be peeled-off from the adhesive layer 3. In addition, since the hydrophilic material layer 4 according to Embodiment 1 is made of a material having superhydrophilicity, and the entrance of the water into the boundary between the adhesive layer 3 and the hydrophilic material layer 4, dissolution of the hydrophilic material layer 4, or the like occurs more favorably, it becomes a state in which the display plate 1 is more likely to be peeled-off from the adhesive layer 3.

Accordingly, even in a case in which the display plate 1 and the polarizing plates 21 and 22 are firmly bonded to each other by the adhesive layer 3, it is possible to facilitate the peeling-off work of the display plate 1 and each of the polarizing plates 21 and 22. In addition, since the hydrophilic material layer 4 is interposed between a part of region of the display plate 1 and the adhesive layer 3, by performing the peeling-off work of the display plate 1 and the polarizing plates 21 and 22, the adhesive layer 3 does not remain in the corresponding region of the display plate 1. Therefore, it is possible to reduce a residual adhesive on the display plate 1, and prevent the adhesive from adhering to the electrode part 15a in the display plate 1 from which the polarizing plates 21 and 22 are peeled-off.

In addition, since the hydrophilic material layer 4 is not laminated on the peripheral edge part of the adhesive layer 3, when the peripheral edge part of the adhesive layer 3 is not removed, the polarizing plates 21 and 22 and the display plate 1 are not easily peeled-off, and quality of the display panel 100 may be secured. Further, in the cleaning process of step S7 in FIG. 4, it is possible to prevent the hydrophilic material layer 4 from being wet with water. Furthermore, when peeling-off the polarizing plates 21 and 22 from the display plate 1, it is sufficient to remove the peripheral edge part of the adhesive layer 3 and apply water to the hydrophilic material layer 4, such that the peeling-off work may be facilitated.

Embodiment 2

In Embodiment 2, an example, in which the hydrophilic material layer 4 is laminated on the adhesive layer 3 in a mode different from that in Embodiment 1, will be described. Further, since other configurations and actions other than configurations and actions to be described below are the same as the above-described Embodiment 1, the same reference numerals are denoted to the corresponding places, and will not be described in detail.

Figure 6:
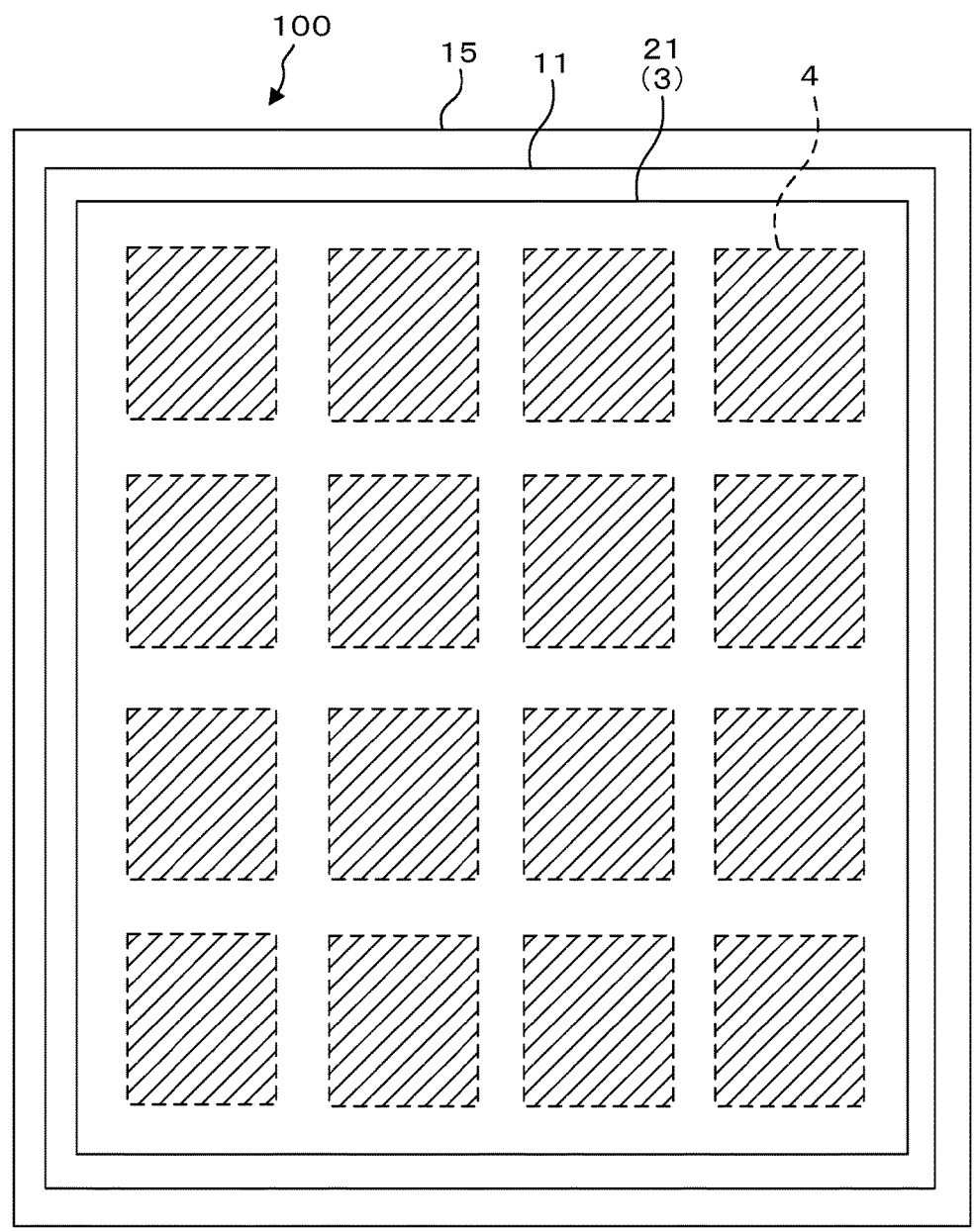
FIG. 6 is a plan view of a display panel according to Embodiment 2.

FIG. 6 is a plan view of a display panel 100 according to Embodiment 2. In the display panel 100 according to Embodiment 2, a plurality of hydrophilic material layers 4 are laminated in a matrix shape on adhesive surface of the adhesive layer 3 on the display plate 1 side. In the example illustrated in FIG. 6, four rows and four columns of hydrophilic material layers 4 are laminated along each side of the adhesive layer 3.

As described above, by laminating the hydrophilic material layers 4 in a matrix shape, even if water enters into the region in which one hydrophilic material layer 4 is laminated, the water does not enter into the regions in which the other hydrophilic material layers 4 are laminated. Accordingly, since the polarizing plates 21 and 22 and the display plate 1 are not easily peeled-off, the quality of the display panel 100 may be more adequately secured.

Further, the hydrophilic material layers 4 laminated in a matrix shape may be laminated so that all have the same size as each other, or may be laminated so as to have different sizes from each other.

Embodiment 3

In Embodiment 3, an example, in which the hydrophilic material layer 4 is laminated on the adhesive layer 3 in a mode different from that in Embodiments 1 and 2, will be described. Further, since other configurations and actions other than configurations and actions to be described below are the same as the above-described Embodiments 1 and 2, the same reference numerals are denoted to the corresponding places, and will not be described in detail.

Figure 7:
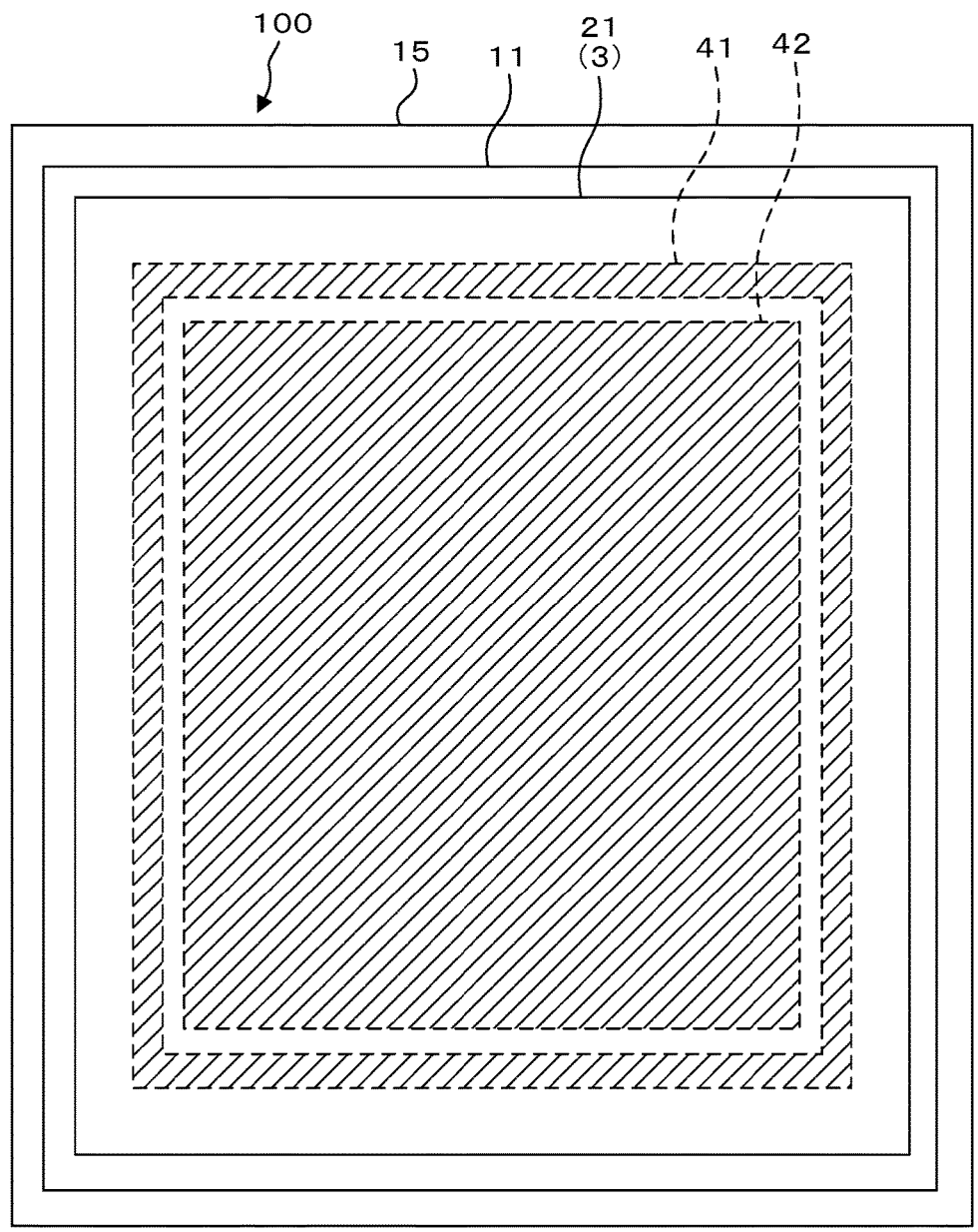
FIG. 7 is a plan view of a display panel according to Embodiment 3.

FIG. 7 is a plan view of a display panel 100 according to Embodiment 3. In the display panel 100 according to Embodiment 3, a first hydrophilic material layer 41 and a second hydrophilic material layer 42, which are made of the same material as the hydrophilic material layer 4 in Embodiment 1, are laminated on adhesive surface of the adhesive layer 3 on the display plate 1 side. The first hydrophilic material layer 41 is laminated on a frame-shaped region inside from the peripheral edge parts of the adhesive layer 3, and the second hydrophilic material layer 42 is laminated on a rectangular region formed inside from the frame-shaped region at an interval.

As described above, by forming the first hydrophilic material layer 41 and the second hydrophilic material layer 42, even if water enters into the region in which the first hydrophilic material layer 41 is laminated, it is possible to prevent water from entering into the region in which the second hydrophilic material layer 42 is laminated, such that the quality of the display panel 100 may be more adequately secured.

In addition, the second hydrophilic material layer 42 is formed at the same position as the display area of the display panel 100, such that it is possible to prevent a deterioration in the display quality which may occur in the vicinity of the boundary between the second hydrophilic material layer 42 and the adhesive layer 3. The same position is, for example, a position where a deviation of the display area in each direction is less than 0.5 mm.

A plurality of the second hydrophilic material layers 42 may be laminated so long as they are inside from the frame-shaped region of the adhesive layer 3. For example, the second hydrophilic material layers 42 may be laminated in a matrix shape in the region inside from the frame-shaped region of the adhesive layer 3.

Embodiment 4

In Embodiment 4, an example, in which the hydrophilic material layer 4 is laminated on the adhesive layer 3 in a mode different from that in Embodiments 1 to 3, will be described. Further, since other configurations and actions other than configurations and actions to be described below are the same as the above-described Embodiments 1 to 3, the same reference numerals are denoted to the corresponding places, and will not be described in detail.

Figure 8:
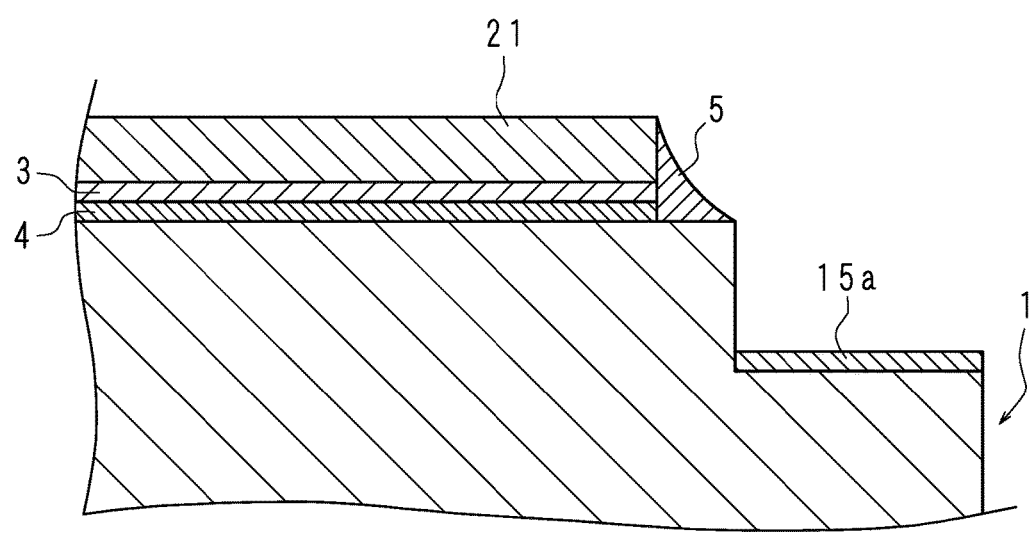
FIG. 8 is an enlarged cross-sectional view illustrating an adhesive part of a display plate and a polarizing plate according to Embodiment 4.

FIG. 8 is an enlarged cross-sectional view illustrating an adhesion portion between the display plate 1 and the polarizing plate 21 according to Embodiment 4. In a display panel 100 according to Embodiment 4, the hydrophilic material layer 4 is laminated on the entire surface of the adhesive layer 3. Further, the display panel 100 includes a covering part 5 formed therein to cover side surfaces of the polarizing plate 21, the adhesive layer 3 and the hydrophilic material layer 4. The covering part 5 is made of, for example, a resin having water resistance. In the case of manufacturing the above-described display panel 100, a process of forming the covering part 5 may be performed between steps S4 to S7 in FIG. 4 in Embodiment 1.

Accordingly, since the covering part 5 includes the material having water resistance, it is possible to prevent water from entering into the hydrophilic material layer 4, such that the quality of the display panel 100 may be secured. In addition, when peeling-off the polarizing plate 21 and the display plate 1, it is sufficient to remove the covering part 5 and apply water to the side surface of the exposed hydrophilic material layer 4, such that the peeling-off work may be facilitated.

Furthermore, in Embodiments 1 to 4, the case, in which the display plate 1 and the polarizing plates 21 and 22 are bonded to each other in the display panel 100, has been described, but for the other laminate in which the plate-shaped or sheet-shaped component is laminated through the adhesive layer, the above-described lamination of the hydrophilic material layer 4 is effective. For example, also in a touch panel device in which the display panel such as the above-described display panel 100 and the touch panel are laminated through the adhesive layer, by laminating the above-described hydrophilic material layer 4 on one side of both sides of the corresponding adhesive layer, it is possible to obtain the same effects as those of Embodiments 1 to 4. Furthermore, among two objects bonded to each other by the adhesive layer, one object corresponds to the first object, and the other object corresponds to the second object.

Furthermore, in Embodiments 1 to 4, the display panel 100, in which the liquid crystal layer 13 is formed between the color filter substrate 11 and the array substrate 15 facing each other, has been described, but it may have other configurations. For example, the display panel 100 may have a configuration in which a circular polarizing plate for anti-reflection is bonded to front surface of the display plate 1 having an organic EL element as a display element.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. Since the scope of the disclosed embodiment is defined by the appended claims rather than by the description preceding them, and all changes that fall within metes and bounds of the claims, or equivalence of such metes and bounds thereof are therefore intended to be embraced by the claims. In addition, technical features described in each embodiment described above may be combined with each other, and new technical features may be formed by the combination.

The invention claimed is:

1. A display panel, comprising:
a display plate having a plurality of display elements;
an adhesive layer laminated on the display plate;
a polarizing plate laminated on the display plate through the adhesive layer; and
a hydrophilic material layer laminated between the display plate and the adhesive layer,
wherein a plurality of the hydrophilic material layers are provided in a matrix shape.

2. The display panel according to claim 1,
wherein the hydrophilic material layer is laminated on a region other than peripheral edge parts of the adhesive layer.

3. The display panel according to claim 2,
wherein the region includes a frame-shaped first region inside from the peripheral edge parts, and a second region formed inside from the first region at an interval.

4. The display panel according to claim 1,
wherein the hydrophilic material layer is laminated on a region including peripheral edge parts of the adhesive layer, and
comprising a covering part which covers a side surface of the hydrophilic material layer.

5. The display panel according to claim 1,
wherein the hydrophilic material layer is made of a material having a contact angle of water of a prescribed angle or less.

6. The display panel according to claim 1,
wherein the display plate has substrates facing each other, and a liquid crystal material is sealed between the substrates, and
the polarizing plates are laminated on each of surface sides of the display plate.

7. A display apparatus comprising the display panel according to claim 1.

8. A laminate, comprising:
a sheet-shaped or plate-shaped first object;
an adhesive layer laminated on the first object;
a second object formed in a sheet shape or plate shape, and laminated on the first object through the adhesive layer; and
a hydrophilic material layer laminated between the first object and the adhesive layer,
wherein the hydrophilic material layer is laminated on a region other than peripheral edge parts of the adhesive layer and is not laminated on the peripheral edge part of the adhesive layer.

9. A laminate, comprising:
a sheet-shaped or plate-shaped first object;
an adhesive layer laminated on the first object;
a second object formed in a sheet shape or plate shape, and laminated on the first object through the adhesive layer; and
a hydrophilic material layer laminated between the first object and the adhesive layer,
wherein a plurality of the hydrophilic material layers are provided in a matrix shape.

10. A display panel, comprising:
a display plate having a plurality of display elements;
an adhesive layer laminated on the display plate;
a polarizing plate laminated on the display plate through the adhesive layer; and
a hydrophilic material layer laminated between the display plate and the adhesive layer,
wherein the hydrophilic material layer is laminated on a region other than peripheral edge parts of the adhesive layer and is not laminated on the peripheral edge part of the adhesive layer.

11. The display panel according to claim 10,
wherein the region includes a frame-shaped first region inside from the peripheral edge parts, and a second region formed inside from the first region at an interval.

12. The display panel according to claim 10, the hydrophilic material layer is made of a material with a contact angle of water of 10 degrees or less.

* * * * *